(12) United States Patent
Podar et al.

(10) Patent No.: US 7,549,160 B1
(45) Date of Patent: Jun. 16, 2009

(54) METHOD AND SYSTEM FOR AUTHENTICATED ACCESS TO INTERNET PROTOCOL (IP) MULTICAST TRAFFIC

(75) Inventors: Sunil Podar, Sunnyvale, CA (US); Sunil K. Chandrupatla, San Jose, CA (US); Sandeep Saksena, San Jose, CA (US); Kali Prasanna Mishra, San Jose, CA (US); Sampath Kumar Sthothra Bhasham, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 898 days.

(21) Appl. No.: 09/745,909

(22) Filed: Dec. 21, 2000

(51) Int. Cl.
*H04L 9/00* (2006.01)
*G06F 7/04* (2006.01)
*G06F 17/00* (2006.01)
*G06F 15/167* (2006.01)
*G06F 15/173* (2006.01)
*G06F 15/16* (2006.01)
*H04K 1/00* (2006.01)
*H04N 7/167* (2006.01)

(52) U.S. Cl. .................. 726/4; 726/3; 726/12; 726/26; 713/153; 713/161; 713/165; 713/168; 380/229; 380/232; 380/241; 705/51; 705/59; 709/213; 709/225; 709/231

(58) Field of Classification Search ................ 713/200, 713/201, 151, 165, 170, 202, 163; 380/212
See application file for complete search history.

(56) References Cited

U.S. PATENT DOCUMENTS

| | | | | |
|---|---|---|---|---|
| 5,671,225 A | * | 9/1997 | Hooper et al. | 370/468 |
| 5,778,187 A | * | 7/1998 | Monteiro et al. | 709/231 |
| 6,026,441 A | * | 2/2000 | Ronen | 709/227 |
| 6,055,518 A | * | 4/2000 | Franklin et al. | 705/37 |
| 6,219,790 B1 | * | 4/2001 | Lloyd et al. | 713/201 |
| 6,233,618 B1 | * | 5/2001 | Shannon | 709/229 |
| 6,243,749 B1 | * | 6/2001 | Sitaraman et al. | 709/223 |
| 6,298,383 B1 | * | 10/2001 | Gutman et al. | 709/229 |
| 6,351,467 B1 | * | 2/2002 | Dillon | 370/432 |
| 6,385,647 B1 | * | 5/2002 | Willis et al. | 709/217 |
| 6,425,003 B1 | | 7/2002 | Herzog et al. | 709/223 |
| 6,427,170 B1 | * | 7/2002 | Sitaraman et al. | 709/226 |
| 6,427,174 B1 | * | 7/2002 | Sitaraman et al. | 709/245 |
| 6,442,165 B1 | * | 8/2002 | Sitaraman et al. | 370/395.4 |
| 6,463,471 B1 | * | 10/2002 | Dreke et al. | 709/224 |

(Continued)

FOREIGN PATENT DOCUMENTS

GB        2398207 A   *   8/2004

OTHER PUBLICATIONS

Engebretson, Joan, Interoperability comes to the Internet, Jul. 1998, Telephony, pp. 61, 66, 68 and 70.*

(Continued)

*Primary Examiner*—Christopher A Revak
*Assistant Examiner*—Aravind K Moorthy
(74) *Attorney, Agent, or Firm*—Baker Botts L.L.P.

(57) ABSTRACT

A method and system for authenticated access to multicast traffic receives a request for a user to join a multicast channel. Access privileges of the user to the multicast channel are authenticated. The request is disallowed in response to at least an unsuccessful authentication.

43 Claims, 3 Drawing Sheets

U.S. PATENT DOCUMENTS

| | | | | |
|---|---|---|---|---|
| 6,466,571 | B1* | 10/2002 | Dynarski et al. | 370/352 |
| 6,507,586 | B1* | 1/2003 | Satran et al. | 370/432 |
| 6,640,251 | B1* | 10/2003 | Wiget et al. | 709/238 |
| 6,718,332 | B1* | 4/2004 | Sitaraman et al. | 707/102 |
| 6,718,387 | B1* | 4/2004 | Gupta et al. | 709/226 |
| 6,751,221 | B1* | 6/2004 | Saito et al. | 370/392 |
| 6,763,019 | B2* | 7/2004 | Mehta et al. | 370/352 |
| 6,791,981 | B1* | 9/2004 | Novaes | 370/390 |
| 6,816,966 | B1* | 11/2004 | Gupta et al. | 713/163 |
| 6,826,612 | B1* | 11/2004 | Bosloy et al. | 709/227 |
| 6,963,573 | B1* | 11/2005 | Cain et al. | 370/401 |
| 6,970,461 | B2* | 11/2005 | Unitt et al. | 370/390 |
| 7,296,091 | B1* | 11/2007 | Dutta et al. | 709/245 |
| 2008/0285559 | A1* | 11/2008 | Luo et al. | 370/390 |
| 2009/0013174 | A1* | 1/2009 | Foti et al. | 713/151 |
| 2009/0022064 | A1* | 1/2009 | Oron et al. | 370/253 |
| 2009/0028153 | A1* | 1/2009 | Koster et al. | 370/392 |
| 2009/0034545 | A1* | 2/2009 | Biggs et al. | 370/401 |

OTHER PUBLICATIONS

Ishikawa et al, An Architecture for User Authentication of IP Multicast and Its Implementation, 1999, IEEE, pp. 81-87.*

Borck, James, Streaming media makes business sense, Jul. 2000, pp. 40-42.*

Hardjono et al, Key Establishment for IGMP Authentication in IP Multicast, 2000, IEEE, pp. 247-252.*

Perrig et al, Efficient Authentication and Signing of Multicast Streams over Lossy Channels, 2000, IEEE, pp. 56-73.*

Pietro et al, A Reliable Key Authentication Schema for Secure Multicast Communications, 2003, IEEE, pp. 1-10.*

J. Heinanen, "Multiprotocol Encapsulation over ATM Adaption Layer 5," Jul. 1993, located at http://www.ietf.org/rfc/rfc1483.txt, 15 pages.

C. Rigney et al., "Remote Authentication Dial In User Service (RADIUS)," Apr. 1997, located at http://wwwin-eng.cisco.com/RFC/RFC/rfc2138.txt, 57 pages.

C. Rigney, "RADIUS Accounting," Apr. 1997, located at http://wwwin-eng.cisco.com/RFC/RFC/rfc2139.txt, 22 pages.

W. Fenner, "Internet Group Management Protocol, Version 2," Nov. 1997, located at http://wwwin-eng.cisco.com/RFC/RFC/rfc2236.txt, 22 pages.

D. Estrin et al., "Protocol Independent Multicast-Sparse Mode (PIM-SM): Protocol Specification," Jun. 1998, located at http://wwwin-eng.cisco.com/RFC/RFC/rfc2362.txt, 58 pages.

G. Gross et al., "PPP over AAL5," Jul. 1998, located at http://www.ietf.org/rfc/rfc2364.txt, 12 pages.

L. Mamakos et al., "A Method for Transmitting PPP over Ethernet (PPPoE)," Feb. 1999, located at http://www.ietf.org/rfc/rfc2516.txt, 16 pages.

D. Ginsburg, "Implementing ADSL," Addison-Wesley ISBN 0-201-65760-0, Jul. 1999.

"IP Multicast Something for Everyone," Packet Magazine, Fourth Quarter 1999, located at http://www.cisco.com/warp/public/784/packet/oct99/ipmulticast.html, 84 pages.

C. Rigney et al., "Remote Authentication Dial In User Service (RADIUS)," Jun. 2000, located at http://wwwin-eng.cisco.com/RFC/RFC/rfc2865.txt, 67 pages.

C. Rigney, "RADIUS Accounting," Jun. 2000, located at http://wwwin-eng.cisco.com/RFC/RFC/rfc2866.txt, 25 pages.

G. Zorn et al., "RADIUS Accounting Modifications for Tunnel Protocol Support," Jun. 2000, located at http://wwwin-eng.cisco.com/RFC/RFC/rfc2867.txt, 10 pages.

G. Zorn et al., "RADIUS Attributes for Tunnel Protocol Support," Jun. 2000, located at http://wwwin-eng.cisco.com/RFC/RFC/rfc2868.txt, 18 pages.

C. Rigney et al., "RADIUS Extensions," Jun. 2000, located at http://wwwin-eng.cisco.com/RFC/RFC/rfc2869.txt, 42 pages.

* cited by examiner

US 7,549,160 B1

METHOD AND SYSTEM FOR AUTHENTICATED ACCESS TO INTERNET PROTOCOL (IP) MULTICAST TRAFFIC

TECHNICAL FIELD OF THE INVENTION

This invention relates generally to the field of traffic multicasting, and more particularly to a method and system for authenticated access to Internet protocol (IP) multicast traffic.

BACKGROUND OF THE INVENTION

Internet protocol (IP) multicast is an Internet standard that enables bandwidth-efficient distribution of video, audio and other data through a network. IP multicast packets are addressed to a group address rather than to a destination IP address such as in a traditional point-to-point communication. The network path that such packets take as they are routed through the network forms a distribution tree.

At the edge of the network, traffic for a multicast group is discarded unless one or more local user devices have joined the group. A user device joins the group by issuing a join request which is automatically processed by the edge device. The edge device then forwards multicast traffic for the group to the user.

The advantage of IP multicast is that even when there are multiple users interested in receiving the same data, only a single copy of the data travels through the backbone network to the network edge. At the edge, the date is replicated and separately transmitted to the users.

IP multicast, however, is geared toward enterprise or corporate networks that permit anyone to join a multicast group. Thus, any user on the network is able to receive multicast traffic as long as that data is available on the network. As a result, service provider networks cannot use IP multicast to distribute premium services.

SUMMARY OF THE INVENTION

The present invention provides a method and system for authenticated access to Internet protocol (IP) multicast traffic that substantially reduce or eliminate problems and disadvantages associated with previous systems and methods. In a particular embodiment, the present invention authenticates access privilege of users attempting to join multicast groups to enable service providers to provide controlled access to value-added services based on multicast content such as video and audio.

In accordance with one embodiment of the present invention, a method and system for authenticated access to multicast traffic receives a request for a user to join a multicast channel. Access privileges of the user to the multicast channel are authenticated. The request is disallowed in response to at least an unsuccessful authentication.

More specifically, in accordance with a particular embodiment of the present invention, the request is allowed in response to at least successful authentication. Authentication of access privileges may be based on the type of the multicast channel, the type of the request to join the multicast channel, or the logged in status of the user to a service provider and/or service including the multicast channel.

The technical advantages of the present invention include providing a method and system for authenticated access to IP multicast traffic. In a particular embodiment, a user request to join a multicast channel is intercepted in an access router and the access privileges for the user authenticated using previously provisioned user access information. Depending on the success of authentication, the join request is allowed or disallowed. Accordingly, users can only join multicast channels that are public or to which they have subscribed and service providers may provide value-added services efficiently over the network using IP multicast.

Another technical advantage of one or more embodiments of the present invention includes providing an improved network-based content delivery system. In particular, service providers are able to distribute content over a network in access-controlled multicast channels. This enables subscription-based business models where service providers can bundle different multicast streams into packages of content to which users can subscribe. As a result, service providers are provided with a new range of revenue opportunities.

Still another technical advantage of one or more embodiments of the present invention includes providing an improved method and system for differentiating services for users sharing common equipment. In particular, different users are allowed access to different multicast video and audio content based on user identification rather than device identification. For example, a parent can subscribe to content different than a child in a same residence.

Other technical advantages of the present invention will be readily apparent to one skilled in the art from the following figures, description and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
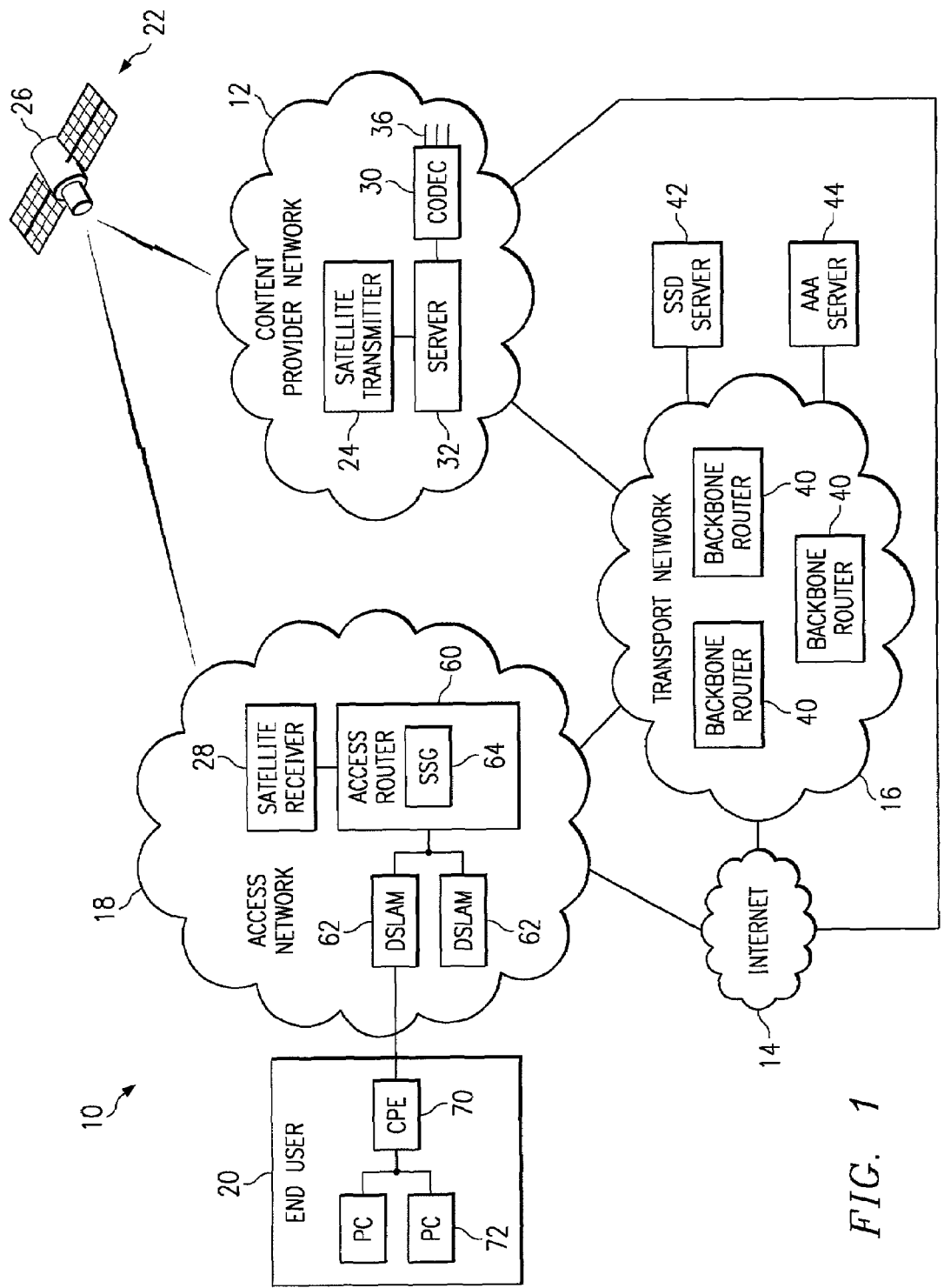
FIG. 1 is a block diagram illustrating a communication system including video multicast services in accordance with one embodiment of the present invention.

FIG. 1 illustrates a communication system 10 in accordance with one embodiment of the present invention. In this embodiment, service and/or content providers provide video services to users through multicast channels to which access is controlled to allow the providers to bill for premium content. Accordingly, some content such as basic network television channels will always be available to users free of charge, but content such as pay-per-view and premium channels are controlled to retain their value as a source of potential revenue. Other services such as Webcam, local, or other special interest group channels may be controlled for privacy and security reasons. Accordingly, service and other providers can deliver differentiated, community or other group-focused services with specific channels as part of a multicast service offering. In providing services, providers can employ content switching mechanisms to replace programming options. For example, a local news program can preempt or replace national programming. It will be understood that in addition to video, audio, data and/or combinations of content types may be provided to users through the access controlled multicast channels. Audio may be radio, music channels or audio-only training materials. Data content can be stock quotes, software distribution and the like.

Referring to FIG. 1, the communications system 10 includes a content provider network 12, the Internet 14, a transport network 16, an access network 18 and end user systems 20. A satellite network 22 may overlay portions of the system 10. The content provider network 12, Internet 14, transport network 16, access network 18, end user system 20, satellite network 22 as well as components of the networks and systems are connected by any suitable wireline or wireless links. In a particular embodiment, the network and systems communicate traffic in Internet protocol (IP) packets. In this embodiment, video services are provided through IP multicast channels. It will be understood that one or more of the networks or systems or portions of the networks or systems may communicate traffic using asynchronous transport mode (ATM), synchronous optical network (SONET) and/or other suitable protocols without departing from the scope of the present invention.

The content provider network 12 receives and/or locally generates video streams. Input video streams 36 are encoded for efficient transmission over the communications system 10 by codec 30 and persistently stored by content delivery server 32. Live content may be fed directly from the codec 30 over the communication system 10 for delivery to end users.

In the IP multicast embodiment, video content is typically encoded in the MPEG 2 format. For performance reasons, the IP packet size used for video streaming should be maximized because larger IP packets leads to a reduced number of packets for the same amount of data and thus reduce routing overhead. If ATM is utilized for transport of the packets, packet size should fit evenly into ATM cells.

The video streams may include broadcast television and cable channels such as bundled commercial channels, basic network television channels, premium channels, pay-per-view channels and public channels. The video streams may also include special interest group channels, local channels, Webcam channels, e-learning channels, and local advertisement channels. The special interest group channels may be targeted at niche audiences having the potential for rapid growth. Local channels may spotlight local cultural events, sports, and other local activities. The Webcam content channels allow mobile users to visually monitor premises, such as homes or daycare centers and enable security agencies to enhance home video services. The e-learning channels enable online learning or education with video from training rooms. The local advertisement channels can be inserted by providers to gain incremental revenue.

The video streams may be transported from the content provider network 12 to an access network or other points of presence (PoP) for delivery to end users using the Internet 14, transport network 14, satellite network 22 or any other suitable network capable of multicasting traffic. Because streaming video over the Internet 14 does not provide quality of service (QoS) controls to a service provider, the end user experience may vary depending upon changes in the traffic load and the native intelligence and configurations of Internet devices along the route. Accordingly, the video streams may be delivered using the transport network 16 which provides a high-quality delivery in a "walled garden" environment enabling the provider to implement strong end-to-end controls over signal quality. Alternatively, the video streams may be transported over the satellite network 22 which may be private to content providers. The satellite network 22 includes a satellite transmitter 24 at the content provider network 12, one or more satellites 26 and a satellite receiver 28 at the access network 18. The satellite network 22 conserves core bandwidth of the transport network 16 and makes the video quality independent of QoS configurations of the transport, or core network 16.

As described in more detail below, the video streams are transported between the content provider and access networks 12 and 18 using IP multicast. Accordingly, only one multicast video stream is transmitted to an access network 18, independently of the number of subscribers. The router nearest the subscriber dynamically, on demand from subscribers, replicates the multicast stream and forwards the replicated streams in the access network 18 to subscribers.

The transport network 16 is an intranet or other wide area network (WAN) capable of transporting video streams from the content provider network 12 to the access network 18. The transport network 16 is multicast enabled and transmits multicast packets in the form of a distribution tree between the content provider network 12 and access networks 18.

The transport network 16 is configured to support the aggregated bandwidth of each access network 18, or central office (CO) as well as high bandwidth multicast video content when video is transported over the core. In a particular embodiment, the transport network 16 comprises backbone routers 40 connected by OC-48 or OC-12 links and transports traffic in the packet over SONET (PoS) format.

The backbone routers 40 utilize protocol independent multicast (PIM V2) or other suitable multicast routing protocols. PIM operates in a dense mode, a sparse mode, or a sparse-dense mode. The sparse-dense mode enables a hybrid environment that allows some heavily accessed channels to be configured in dense mode and others in sparse mode. It will be understood that other modes and/or multicast routing protocols may be used in the transport and other networks without departing from the scope of the present invention.

In a particular embodiment, the precedence of the IP packets is set to committed access rate (CAR) at content aggregation in the content network 12. CAR allows packets to be flagged and/or dropped if they maintain or exceed static bandwidth configurations and can be implemented with a simple configuration. The rate limiting capability of CAR can be optimally used to control the amount of bandwidth for IP multicast streams from the content provider network 12. In this embodiment, the transport network 40 may implement a weighted random early detection (WRED) protocol for congestion management and congestion avoidance. Weighted fair queuing (WFQ) may be used in the access network 18. WFQ breaks up the usable bandwidth based on the current precedence of the packets currently queued to allow for a statistically more balanced queue.

The transport network 16 is coupled to and/or includes a service selection dashboards (SSD) server 42 and an authentication, authorization, and accounting (AAA) server 44. The SSD server 42 provides users with logon pages for their service provider and subscribed services. The SSD server 42 also generates and provides users with web pages displaying options available for selections. For example, after a user has logged onto a service provider, the SSD server 42 may generate and display to the user a web page including the services to which the user has subscribed and may select.

The AAA server 44 maintains user and service profiles. The profiles are stored persistently and accessed directly or indirectly to authenticate users and services for users. In one embodiment, the service profiles include a list of multicast IP addresses associated with each premium or other non-public service. As used herein, each means every one of at least a subset of identified items. The user profile correlates the user identity with subscribed service packages, and thus subscribed channels. In a specific embodiment, the AAA server 44 provides standard remote authentication dial-in user service (RADIUS) based functionality.

The access network 18 communicates traffic between the Internet, transport, satellite or other suitable core network and the end user system 20. In the illustrated embodiment, the access network 18 comprises an asymmetric digital subscriber line (ADSL) architecture to provide high downstream and low upstream bandwidth which is well-suited for delivery of multicast video services. The DSL access architecture may be point-to-point over ATM (PPPoA), point-to-point over Ethernet (PPoE), route bridge encapsulation (RBE) or other suitable architecture. It will be understood that symmetric, very-high speed and other DSL technologies may be used as well as other suitable access technologies for communicating between the core network and the end user system 20.

The access network 18 includes an access router 60 coupled to the core network and a plurality of digital subscriber line access multiplexers (DSLAM) 62 coupled between the access router 60 and the end user systems 20. The DSLAMs 62 aggregate and forward DSL traffic from the end user systems 20 to the access router 60.

The access router 60 aggregates high capacity feeds from the DSLAMs 62. On the downstream side, the access router 60 receives multicast video streams from the transport network 16 or the satellite network 22 through the satellite receiver 28 and, as the last multicast router for the video streams, replicates multicast packets and forwarding them downstream. As described in more detail below, the access router 60 intercepts request for a user to join a multicast channel and authenticates the request using service selection gateway (SSG) 64. Accordingly, each access router 60 terminating point-to-point protocol (PPP) connections with the end user systems 20 should include an SSG image. The SSG 64 also allows a user to connect simultaneously to multiple destinations.

The end user systems 20 each include customer premise equipment (CPE) 70 and one or more host 72, which may be personal computers or other suitable computing devices. In a particular embodiment, the host 72 are PCs connected over an Ethernet local area network (LAN) with the CPE 70. The PCs include a web browser or other media player and/or plug-ins to display video data from a multicast stream. When the user starts a media player or plug-in to join a multicast channel, a join request is created for multicast channel and transmitted to the access network 18 for processing. In the IP embodiment, the join request is an IGMP join request. The PC is identified to the access network 18 based on its IP address.

In the communication system 10, the access router 60 in connection with the SSG 64, SSD server 42 and AAA server 44 provides a service architecture for video multicast services with support for authenticated access channels. Users log on to the network by connecting to a known uniform resource locator (URL) of the service provider of the access network 18 and then entering a login name and password on a login page. Successful log-ins display a dashboard menu of the users subscribed service packages. Users select a multicast package, which displays an associated web page that lists available channels or channel categories. When a user selects a channel, the channel is displayed in a viewer window in a web page. During login to the service provider and selection of a service package and/or channel, access privileges of the user are validated to allow service providers to completely control access to provided content.

Figure 2:
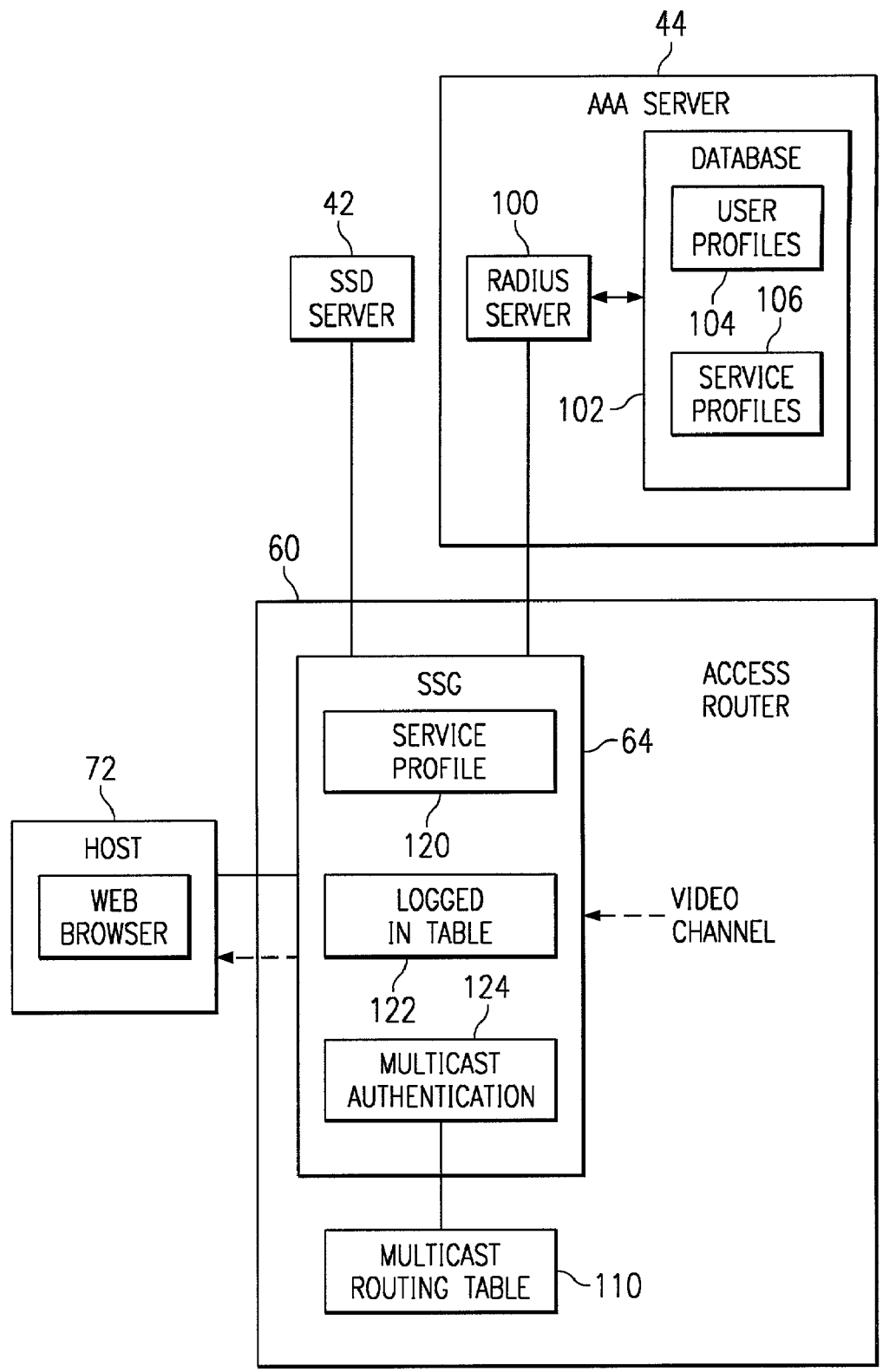
FIG. 2 is a block diagram illustrating details of the multicast authentication components of the communication system of FIG. 1 in accordance with one embodiment of the present invention.

FIG. 2 illustrates details of the authentication components of the communications network 10 in accordance with one embodiment of the present invention. In this embodiment, authentication and other components of the communications system 10 may comprise logic encoded in media. The logic comprises functional instructions for carrying out the program task. The media comprises computer disk or other suitable computer-readable media, application specific integrated circuits (ASIC), field programmable gate arrays (FPGA), digital signal processor (DSP) or other suitable specific or general purpose processors, transmission media or other suitable media in which logic may be encoded and utilized.

Referring to FIG. 2, the AAA server 44 comprises a RADIUS server 100 and a database 102. The RADIUS server 100 includes authentication and billing services for the service provider. Database 102 includes user profiles 104 and service profiles 106. The RADIUS server 100 communicates with SSG 64 and with the SSD server 42 using the RADIUS protocol. The SSD server 42 communicates with host 72 through the access router 60 using hypertext transfer protocol (HTTP). It will be understood that the servers router and host may communicate using other suitable protocols without departing from the scope of the present invention.

The access router 60 includes SSG 64 and a multicast routing table 110. SSG 64 includes a service profile 120 downloaded from database 102, a logged in table 122 and a multicast authentication engine 124. The service profile table 120 is maintained by and downloaded from the database 102. The service profile 120 contains a record of IP multicast ranges and service names for non-public multicast channels. Thus, public channels available to all users upon request are not listed in the service profile 120. The login table 122 maintains a record of all users currently logged in to the system and logged in to identified services.

The multicast authentication engine 124 intercepts multicast join request messages and authenticates whether the user is permitted to access the identified multicast channel using the service profile 120, login table 122 and/or the RADIUS server and database 100 and 102. Upon successful authentication, the multicast authentication engine 124 allows processing of the join request. Upon unsuccessful authentication, the multicast authentication engine 124 discards, blocks or otherwise disallows the join request. Thus, the multicast stream is authenticated only at the join request. The actual multicast data packets need not be verified which minimizes authentication processing.

Multicast routing table 110 identifies users joined to each multicast channel. Accordingly, after successful authentication and processing of a join request, the user is added to the multicast routing table 110. Traffic received for a multicast channel is forwarded to each identified user. It will be understood that video channels may be provided to end users with or without modification by the access router 60.

In operation, to access a video service, users log in to the service provider network, select a multicast video service, and select a video channel. For user login, users connect through a web browser to a known address of the SSD server 42 and are presented with a user login page. Users enter a user name and password and the page is forwarded to the SSD server 42, which communicates with the RADIUS server 100 through SSG 64 to authenticate the user. The RADIUS server 100 accesses the database 102 and generates a RADIUS reply containing a list of services to which the user has subscribed. The SSD server 42 displays this list of services to the user via their browser in a dashboard menu format.

At service login, when the user selects a service from the dashboard, the selection is forwarded to the SSD server 42, which retrieves the service profile for the user from the RADIUS server 100. The SSD server 42 visually indicates to the user that the user is logged in to the service. The SSD server 42 then redirects the browser to the proper URL which displays the service web page that contains a list of channels or channel categories for selection by the user. The logged in status of the user to the service provider and a service is recorded in the logged in table 122.

At channel access, when a user selects a channel, the users host device 72 issues an IGMP join request for the multicast channel through an interaction between a plug-in and media player. The plug-in learns the channel-to-IP address mapping by interacting with the web server associated with the service or by listening to a continuously multicast stream of mapping information. When the user joins a multicast channel by inclusion in the multicast routing table, the access router 60 forwards multicast packets to the user for display on the host screen.

Prior to processing of the IGMP join request, the SSG 64 intercepts the join message at the access router 60 and allows the join to succeed only if the channel is included in one of the services to which the user has currently logged in or the channel is a free channel as determined from the logged in table 122 and service profile 120. Because users can only log in to subscribed packages, user access is limited to only those channels included in their subscribed packages in addition to free channels.

In a specific embodiment, a host object is created in the logged in table 122 of SSG 64 when a user logs in to his or her account. When the user logs in to a service, SSG 64 creates a connection object and points to a service object for the user in the logged in table 122. Thus, if the user attempts to bypass normal procedures and issues a join request through other means, multicast authentication will detect this by the absence of a valid connection object for the requested service and the join request will be dropped to prevent unauthorized access.

Figure 3:
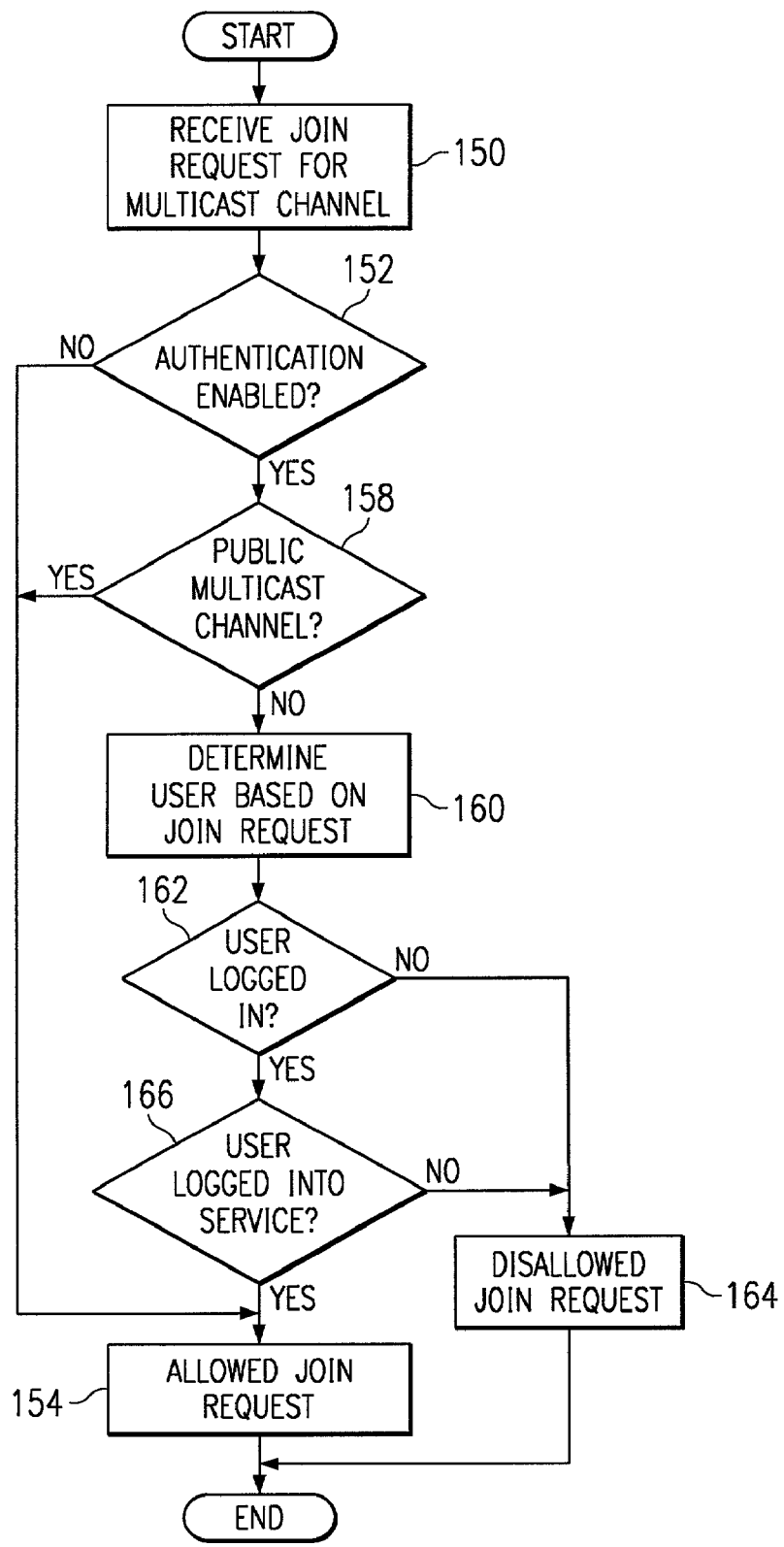
FIG. 3 is a flow diagram illustrating a method for authenticated access to Internet protocol (IP) multicast traffic in accordance with one embodiment of the present invention.

FIG. 3 illustrates a method for authenticated access to multicast traffic in accordance with one embodiment of the present invention. The method begins at step 150 in which an IGMP or other suitable subscriber join request is received for a user to join a multicast channel providing content over a network.

Proceeding to decisional step 152, the access router 60 determines whether authentication is enabled. If authentication is not enabled, the No branch of decisional step 152 leads to step 154 in which the join request is allowed and processed. If authentication is enabled, the Yes branch of decisional step 152 leads to decisional step 158 for authentication.

At decisional step 158, the access router 60 determines whether the multicast channel is a public multicast channel to which all users are allowed access. If the multicast channel is public, the Yes branch of decisional step 158 also leads to step 154 in which the join request is allowed and processed. If the multicast channel is a non-public controlled access channel, such as a premium channel, the No branch of decisional step 158 leads to step 160.

At step 160, the user is determined based on the join request. In one embodiment, the SSG 64 translates between the host IP address and the user name and password to identify the user. User authentication may be based on user, device or other suitable identifier.

Next, at decisional step 162, the SSG 64 determines whether the user is logged in to the service provider. If the user is not logged in to the service provider, then the join request is improper and the No branch of decisional step 162 leads to step 164 in which the join request is disallowed. If the user is logged in to the service provider, the Yes branch of decisional step 162 leads to decisional step 166 for further authorization.

At step 166, the SSG 64 determines whether the user is logged in to a service including the multicast channel. Because login is only allowed to services for which the user has access privileges, determining that the user is logged in to the service validates that the user has access privileges to a service. It will be understood that access privileges of a user to a multicast channel may be otherwise suitably authenticated without departing from the scope of the present invention. For example, the user profile may be directly checked to determine access privileges of the user to the service. If the user is logged in to the service, the user has access privileges to the multicast channel and the Yes branch of decisional step 166 leads to step 154 in which the join request is allowed. If the user is not logged in to the service or does not have access privileges, the No branch of decisional step 166 leads to step 164 in which the join request is disallowed. Accordingly, users may only access multicast channels to which they have access privileges. In this way, service providers may provide subscription-based content using bandwidth-efficient IP multicast.

Although the present invention has been described with several embodiments, various changes and modifications may be suggested to one skilled in the art. It is intended that the present invention encompass such changes and modifications as fall within the scope of the appended claims.

What is claimed is:

1. A method for authenticated access to multicast traffic, comprising:
   receiving an Internet group management protocol request at an access network router operable to authenticate a plurality of requests received from a plurality of customer premise systems, the received request identifying a user requesting to join an IP multicast channel, the IP multicast channel selected from a bundle of IP multicast channels offered for receipt by the user as a multicast package on a subscription basis;
   authenticating access privileges of the user to the multicast channel, wherein authenticating access privileges of the user comprises:
      determining whether the user is logged in to a service provider providing a service including the multicast channel;
      determining whether the user is logged in to the service including the multicast channel; and
      successfully authenticating access privileges of the user to the multicast channel in response to at least the user logged in to the service provider and the service; and
   disallowing the request in response to at least an unsuccessful authentication.

2. The method of claim 1, authenticating access privileges of the user comprising:
   determining whether the user has access privileges to the multicast channel based on previously provisioned information for the user; and
   unsuccessfully authenticating access privileges of the user to the multicast channel in response to at least the user not having access privileges to the multicast channel.

3. The method of claim 1, further comprising allowing the request in response to at least successful authentication.

4. The method of claim 1, wherein the multicast channel comprises at least one of video, audio, data and combinational content.

5. The method of claim 1, further comprising:
   prior to receiving the request, provisioning the user's access privileges in an authentication, authorization, and accounting (AAA) server; and accessing the AAA server to authenticate access privileges of the user to the multicast channel.

6. The method of claim 5, wherein the AAA server comprises a remote authentication dial-in user service (RADIUS) server.

7. The method of claim 1, wherein the multicast channel comprises an Internet protocol (IP) multicast channel and the request includes an IP address of the user device, further comprising determining the user based on the IP address of the device.

8. The method of claim 1, authenticating access privileges of the user comprising:
 determining whether the multicast channel comprises a public multicast channel; and
 successfully authenticating access privileges of the user to the multicast channel in response to at least the multicast channel comprising the public multicast channel.

9. The method of claim 1, authenticating access privileges of the user comprising:
 determining whether the user is logged in to a service provider providing the multicast channel; and
 unsuccessfully authenticating access privileges of the user to the multicast channel in response to at least the user not logged in to the service provider.

10. The method of claim 1, authenticating access privileges of the user comprising:
 determining whether the user is logged in to a service including the multicast channel; and
 unsuccessfully authenticating access privileges of the user to the multicast channel in response to at least the user not logged in to the service including the multicast channel.

11. The method of claim 1, wherein the request is a subscriber join request.

12. The method of claim 1, authenticating access privileges of the user comprising:
 determining whether the multicast channel is a controlled access multicast channel; and
 authenticating access privileges of the user to the multicast channel in response to at least the multicast channel comprising the controlled access multicast channel.

13. The method of claim 1, further comprising:
 determining if authentication is enabled at an access router receiving the request;
 authenticating access privileges of the user to the multicast channel in response to at least determining that authentication is enabled; and
 allowing the request in response to at least determining authentication is not enabled.

14. A system for authenticated access to multicast traffic, comprising:
 means for receiving an Internet group management protocol request at an access network router operable to authenticate a plurality of requests received from a plurality of customer premise systems, the received request identifying a user requesting to join an IP multicast channel, the IP multicast channel selected from a bundle of IP multicast channels offered for receipt by the user as a multicast package on a subscription basis;
 means for authenticating access privileges of the user to the multicast channel, wherein the means for authenticating access privileges of the user comprises:
  means for determining whether the user is logged in to a service provider providing a service including the multicast channel;
  means for determining whether the user is logged in to the service including the multicast channel; and
  means for successfully authenticating access privileges of the user to the multicast channel in response to at least the user logged in to the service provider and the service; and
 means for disallowing the request in response to at least an unsuccessful authentication.

15. A system of claim 6, the means for authenticating access privileges of the user comprising:
 means for determining whether the user has access privileges to the multicast channel based on previously provisioned information for the user; and
 means for unsuccessfully authenticating access privileges of the user to the multicast channel in response to at least the user not having access privileges to the multicast channel.

16. A system of claim 14, further comprising means for allowing the request in response to at least successful authentication.

17. A system of claim 14, wherein the multicast channel comprises at least one of video, audio, data and combinational content.

18. A system of claim 14, further comprising:
 means for, prior to receiving the request, provisioning the user's access privileges in an authentication, authorization, and accounting (AAA) server; and
 means for accessing the AAA server to authenticate access privileges of the user to the multicast channel.

19. A system of claim 18, wherein the AAA server comprises a remote authentication dial-in user service (RADIUS) server.

20. A system of claim 14, wherein the multicast channel comprises an Internet protocol (IP) multicast channel and the request includes an IP address of the user device, further comprising means for determining the user based on the IP address of the device.

21. A system of claim 14, the means for authenticating access privileges of the user comprising:
 means for determining whether the multicast channel comprises a public multicast channel; and
 means for successfully authenticating access privileges of the user to the multicast channel in response to at least the multicast channel comprising the public multicast channel.

22. A system of claim 14, the means for authenticating access privileges of the user comprising:
 means for determining whether the user is logged in to a service provider providing the multicast channel; and
 means for unsuccessfully authenticating access privileges of the user to the multicast channel in response to at least the user not logged in to the service provider.

23. A system of claim 14, the means for authenticating access privileges of the user comprising:
 means for determining whether the user is logged in to a service including the multicast channel; and
 means for unsuccessfully authenticating access privileges of the user to the multicast channel in response to at least the user not logged in to the service including the multicast channel.

24. A system of claim 14, wherein the request is a subscriber join request.

25. A system of claim 14, the means for authenticating access privileges of the user comprising:
 means for determining whether the multicast channel is a controlled access multicast channel; and means for authenticating access privileges of the user to the multicast channel in response to at least the multicast channel comprising the controlled access multicast channel.

26. A system of claim 14, further comprising:

means for determining if authentication is enabled at an access router receiving the request;

means for authenticating access privileges of the user to the multicast channel in response to at least determining that authentication is enabled; and means for allowing the request in response to at least determining authentication is not enabled.

27. A system for authenticated access to multicast traffic, comprising:

logic encoded in media; and the logic operable to receive and authenticate a plurality of requests received from a plurality of customer premise systems, at least one of the plurality of requests comprising an Internet group management protocol request for a user to join an IP multicast channel selected from a bundle of IP multicast channels offered for receipt by the user as a multicast package on a subscription basis, to authenticate access privileges of the user to the multicast channel, the logic operable to authenticate access privileges of the user by:

determining whether the user is logged in to a service provider providing a service including the multicast channel;

determining whether the user is logged in to the service including the multicast channel; and successfully authenticating access privileges of the user to the multicast channel in response to at least the user logged in to the service provider and the service, and to disallow the request in response to at least an unsuccessful authentication.

28. The system of claim 27, the logic operable to authenticate access privileges of the user by:

determining whether the user has access privileges to the multicast channel based on previously provisioned information for the user; and unsuccessfully authenticating access privileges of the user to the multicast channel in response to at least the user not having access privileges to the multicast channel.

29. The system of claim 27, the logic further operable to allow the request in response to at least successful authentication.

30. The system of claim 27, wherein the multicast channel comprises at least one of video, audio, data and combinational content.

31. The system of claim 27, the logic further operable to:

prior to receiving the request, provision the user's access privileges in an authentication, authorization, and accounting (AAA) server; and access the AAA server to authenticate access privileges of the user to the multicast channel.

32. The system of claim 31, wherein the AAA server comprises a remote authentication dial-in user service (RADIUS) server.

33. The system of claim 27, wherein the multicast channel comprises an Internet protocol (IP) multicast channel and the request includes an IP address of the user device, the logic further operable to determine the user based on the IP address of the device.

34. The system of claim 27, the logic operable to authenticate access privileges of the user by:

determining whether the multicast channel comprises a public multicast channel; and successfully authenticating access privileges of the user to the multicast channel in response to at least the multicast channel comprising the public multicast channel.

35. The system of claim 27, the logic operable to authenticate access privileges of the user by:

determining whether the user is logged in to a service provider providing the multicast channel; and unsuccessfully authenticating access privileges of the user to the multicast channel in response to at least the user not logged in to the service provider.

36. The system of claim 27, the logic operable to authenticate access privileges of the user by:

determining whether the user is logged in to a service including the multicast channel; and unsuccessfully authenticating access privileges of the user to the multicast channel in response to at least the user not logged in to the service including the multicast channel.

37. The system of claim 27, wherein the request is a subscriber join request.

38. The system of claim 27, the logic operable to authenticate access privileges of the user by:

determining whether the multicast channel is a controlled access multicast channel; and authenticating access privileges of the user to the multicast channel in response to at least the multicast channel comprising the controlled access multicast channel.

39. The system of claim 27, the logic further operable to:

determine if authentication is enabled at an access router receiving the request;

authenticate access privileges of the user to the multicast channel in response to at least determining that authentication is enabled; and allow the request in response to at least determining authentication is not enabled.

40. A method for providing premium content services over a network using Internet protocol (IP) multicast channels, comprising:

provisioning user access privileges to an IP multicast channel providing premium content, the premium content including at least one of video, audio and data;

authenticating access privileges of a user to the IP multicast channel upon receiving an Internet group management protocol request at an access network router operable to authenticate a plurality of requests received from a plurality of customer premise systems, the received request identifying a user requesting to join an IP multicast channel to receive the premium video content, the IP multicast channel selected from a bundle of IP multicast channels offered for receipt by the user as a multicast package on a subscription basis, wherein authenticating access privileges of the user comprises:

determining whether the user is logged in to a service provider providing a service including the multicast channel;

determining whether the user is logged in to the service including the multicast channel; and successfully authenticating access privileges of the user to the multicast channel in response to at least the user logged in to the service provider and the service; and disallowing the request in response to unsuccessful authentication.

41. A method for authenticated access to multicast traffic, comprising:

receiving an Internet group management protocol request at an access network router operable to authenticate a plurality of requests received from a plurality of customer premise systems, the received request identifying a user requesting to join an Internet protocol (IP) multicast channel;
authenticating access privileges of the user to the IP multicast channel by at least one of:
  determining whether the IP multicast channel is a public multicast channel;
  determining whether the user is logged in to a service provider providing a service including the IP multicast channel;
  determining whether the user is logged in to the service including the IP multicast channel;
successfully authenticating access privileges of the user to the IP multicast channel in response to at least one of determining the multicast channel is a public multicast channel and determining the user is logged in to the service provider and the service;
unsuccessfully authenticating access privileges of the user to the IP multicast channel in response to at least one of determining the user is not logged in to the service provider and determining the user is not logged in to the service;
terminating the request in response to at least an unsuccessful authentication; and
processing the request in response to at least a successful authentication.

42. A method for authenticated access to multicast traffic, comprising:
receiving an Internet group management protocol request at an access network router operable to authenticate a plurality of requests received from a plurality of customer premise systems, the received request identifying a user requesting to join an IP multicast channel, the IP multicast channel selected from a bundle of IP multicast channels offered for receipt by the user as a multicast package on a subscription basis;
authenticating access privileges of the user to the multicast channel, wherein authenticating access privileges of the user comprises:
  determining whether the user is logged in to a service provider providing a service including the multicast channel;
  determining whether the user is logged in to the service including the multicast channel; and
  successfully authenticating access privileges of the user to the multicast channel in response to at least the user logged in to the service provider and the service;
replicating multicast channel, at the access network router, in response to at least a successful authentication; and
transmitting the replicated multicast traffic to a customer premise system associated with the user.

43. A method for authenticated access to multicast traffic, comprising:
receiving an Internet group management protocol request at an access network router operable to authenticate a plurality of requests received from a plurality of customer premise systems, the received request identifying a user requesting to join a selected IP multicast channel;
authenticating access privileges of the user to the multicast channel by determining if the selected IP multicast channel is within a bundle of IP multicast channels offered for receipt by the user as a multicast package on a subscription basis, wherein authenticating access privileges of the user comprises:
  determining whether the user is logged in to a service provider providing a service including the multicast channel;
  determining whether the user is logged in to the service including the multicast channel; and
  successfully authenticating access privileges of the user to the multicast channel in response to at least the user logged in to the service provider and the service; and
disallowing the request in response to determining that the selected IP multicast channel is not within the bundle of IP multicast channels.

* * * * *